J. SAUNDERS.
Manufacture of Sulphuric Acid.

No. 144,928. Patented Nov. 25, 1873.

WITNESSES.
A. W. Almqvist
Alex F. Roberts

INVENTOR.
J. Saunders
BY
ATTORNEYS.

UNITED STATES PATENT OFFICE.

JOSEPH SAUNDERS, OF BROOKLYN, NEW YORK.

IMPROVEMENT IN THE MANUFACTURE OF SULPHURIC ACID.

Specification forming part of Letters Patent No. 144,928, dated November 25, 1873; application filed November 8, 1873.

*To all whom it may concern:*

Be it known that I, JOSEPH SAUNDERS, of Brooklyn, Kings county, New York, have invented a new and useful Improvement in Balls for Sulphuric-Acid-Condensing Towers, of which the following is a specification:

My invention consists of hollow glass balls for sulphuric-acid-condensing towers, known as "Gay-Lussac's Towers," to be used in substitution of the coke, earthen balls, and other like substances, which are objectionable, because they become disintegrated and crumble to pieces in a short time, whereas glass is indestructible by the acid.

Figure 1:
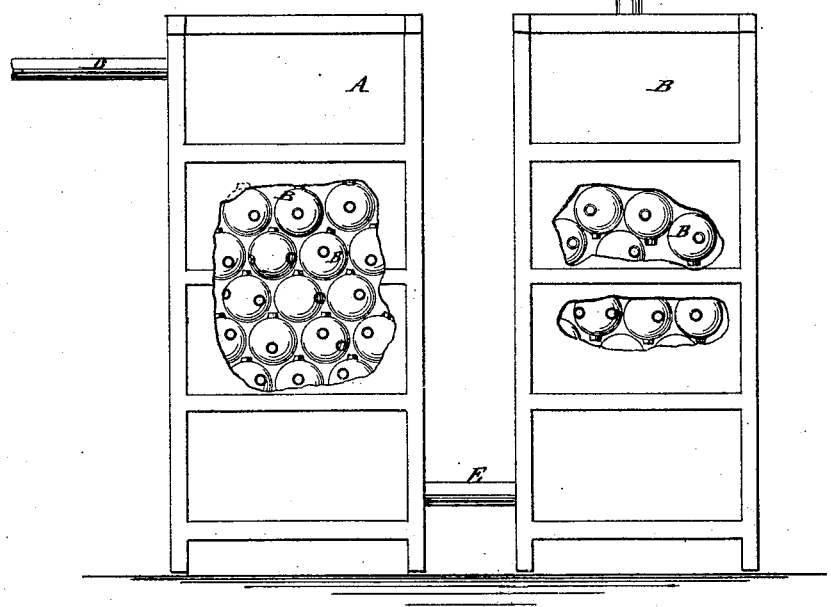
Figure 2:
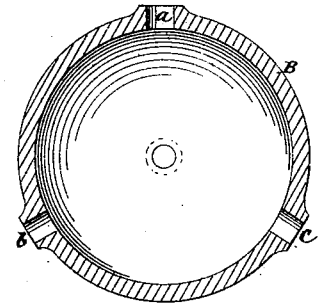

Figure 1 is a side elevation of a couple of towers with parts broken out to show the arrangement of the balls, and Fig. 2 is a sectional elevation of one of the balls.

A represents the towers, which are lined with lead. B represents the glass balls with which said towers are filled, said balls being hollow; and they have, say, three openings, *a b c*, through the shell. D is a pipe leading into the top of one of said towers, through which the gas flows. E is a pipe, connecting the towers at the bottom, for the gas to flow into the next tower to ascend in it.

In practice, the balls will, by preference, be made about six inches in diameter; and in the tower in which the gas descends the balls will be arranged with the opening *a* at the top, and in the tower in which the gas ascends the balls will be reversed, so that the waste gases from the chambers containing the nitrous fumes are thus compelled to enter the balls in great measure, whereby the absorption of the nitrous fumes by the gas is greatly accelerated, and the process of condensation thereby hastened.

Having thus described my invention, I claim as new and desire to secure by Letters Patent—

Hollow balls of glass for sulphuric-acid-condensing towers, substantially as specified.

JOSEPH SAUNDERS.

Witnesses:
A. P. THAYER,
T. B. MOSHER.